US009109056B2

(12) United States Patent
Kim et al.

(10) Patent No.: US 9,109,056 B2
(45) Date of Patent: Aug. 18, 2015

(54) METHOD OF PREPARATION OF SPHERICAL SUPPORT FOR OLEFIN POLYMERIZATION CATALYST

(75) Inventors: Eun-Il Kim, Daejon (KR); Young-Joo Lee, Inchon (KR); Hoe-Chul Jung, Seosan (KR); Joon-Ryeo Park, Seoul (KR)

(73) Assignee: SAMSUNG TOTAL PETROCHEMICALS CO., LTD., Chungnam (KR)

( * ) Notice: Subject to any disclaimer, the term of this patent is extended or adjusted under 35 U.S.C. 154(b) by 1084 days.

(21) Appl. No.: 12/676,264

(22) PCT Filed: Sep. 11, 2008

(86) PCT No.: PCT/KR2008/005374

§ 371 (c)(1), (2), (4) Date: Mar. 3, 2010

(87) PCT Pub. No.: WO2009/075461

PCT Pub. Date: Jun. 18, 2009

(65) Prior Publication Data

US 2010/0172820 A1 Jul. 8, 2010

(30) Foreign Application Priority Data

Dec. 12, 2007 (KR) ........................ 10-2007-0128627

(51) Int. Cl.
*C08F 10/00* (2006.01)

(52) U.S. Cl.
CPC ..................................... *C08F 10/00* (2013.01)

(58) Field of Classification Search
None
See application file for complete search history.

(56) References Cited

U.S. PATENT DOCUMENTS

| | | | | |
|---|---|---|---|---|
| 5,162,277 | A | 11/1992 | Job | |
| 5,955,396 | A | 9/1999 | Lee et al. | |
| 7,767,614 | B2 * | 8/2010 | Kim et al. | 502/150 |
| 2010/0130707 | A1 * | 5/2010 | Kim et al. | 526/125.3 |
| 2011/0166394 | A1 * | 7/2011 | Kim et al. | 568/851 |

FOREIGN PATENT DOCUMENTS

| | | | |
|---|---|---|---|
| BE | 636326 | * | 2/1964 |
| EP | 1108730 | * | 6/2001 |
| JP | 03-74341 | | 3/1991 |
| JP | 04-368391 | | 12/1992 |
| JP | 05-001112 | | 1/1993 |
| JP | 06-87773 | | 3/1994 |
| JP | 08-73388 | | 3/1996 |
| KR | 10-2005-0053938 | | 6/2005 |
| KR | 10-2006-0027486 | | 3/2006 |

OTHER PUBLICATIONS

Tetrahedron Letters vol. 27 Issue40 pp. 4861-4864 Journal 1986 Matthews et al. Tetrahedron Letters, vol. 27 , Issue40 pp. 4861-4864, 1986.*
International search report dated Mar. 25, 2009in corresponding PCT/KR2008/005374.

* cited by examiner

*Primary Examiner* — Yun Qian
(74) *Attorney, Agent, or Firm* — Young & Thompson

(57) ABSTRACT

Provided is a method of preparation of a spherical support for an olefin polymerization catalyst. Specifically, provided is a method of preparation of a support which can be used in preparation of an olefin polymerization catalyst, wherein, MgX(I) (X=halogen atom) is prepared by reacting a reaction initiator, nitrogen halide, and magnesium metal, and then magnesium metal and alcohol are reacted in the presence of the MgX, thereby resulting a smooth-surfaced spherical dialkoxy magnesium support having a uniform particle size distribution.

12 Claims, No Drawings

METHOD OF PREPARATION OF SPHERICAL SUPPORT FOR OLEFIN POLYMERIZATION CATALYST

TECHNICAL FIELD

The present invention relates to a method of preparation of a spherical support for an olefin polymerization catalyst. Specifically, it relates to a method of preparation of a support which comprises a step of reaction of magnesium metal with alcohol, wherein firstly, MgX(I) (X=halogen atm) is prepared by reacting a reaction initiator, nitrogen halide, with magnesium metal at same ratio in equivalent weight and then a reaction of magnesium metal and alcohol is performed in the presence of the MgX, thereby resulting a smooth-surfaced spherical dialkoxy magnesium having a uniform particle size distribution which is useful for a preparation of an olefin polymerization catalyst.

BACKGROUND ART

One of the most widely used olefin polymerization catalysts is currently, Ziegler-Natta catalyst supported by magnesium chloride. The magnesium chloride-supported Ziegler-Natta catalyst is a solid catalyst component normally comprised of magnesium, titanium, halogen and an electron donating organic compound. When being used in polymerization of alpha-olefin such as propylene, it may be mixed and used with an organoaluminum compound as a cocatalyst and an organosilane compound as a stereoregularity regulator, at a suitable ratio. Since supported solid catalysts for olefin polymerization are used in various commercialized polymerization processes such as slurry polymerization, bulk polymerization, gas phase polymerization and the like, they need to satisfy various requirements regarding a particle morphology such as suitable particle dimension and shape, uniform particle size distribution, minimized amount of macroparticles or microparticles and high bulk density, etc., as well as basically required properties such as high catalyst activity and stereoregularity.

For methods for improving particle morphology of a support for olefin polymerization catalyst, a recrystallization and reprecipitation method, a spray drying method, a chemical method and the like have been known in the art. Among them, a method for preparing a catalyst by using dialkoxy magnesium as a support, obtained from the reaction of magnesium and alcohol, i.e. one of the chemical methods, has been getting great attentions recently, since it is possible to provide a catalyst having significantly improved activity and providing polymers with high stereoregularity, as compared to other conventional methods. However, when using dialkoxy magnesium as a support, the particle shape, particle size distribution and bulk density thereof will directly affect the resulted catalyst and the particle characteristics of the produced polymers. Therefore, it is needed to produce a dialkoxy magnesium support having a uniform size, a spherical shape and sufficiently high bulk density, from the reaction between magnesium and alcohol. Particularly, a large amount of macroparticles deteriorate the flowability of polymers, and thus would make problems when being applied to a mass-production in plant-scale.

Various methods for preparing dialkoxy magnesium having a uniform shape have been disclosed in conventional technical literatures. U.S. Pat. Nos. 5,162,277 and 5,955,396 suggest methods for preparing a support having a size of 5-10 μm, by recrystallizing magnesium ethyl carbonate in a solution of various additives and solvent, wherein the magnesium ethyl carbonate is obtained from carboxylation of amorphous diethoxy magnesium. Further, Japanese laid-open patent publication Heisei06-87773 discloses a method for preparing spherical particles through processes of spray-drying an alcohol solution of diethoxy magnesium which has been carboxylated by carbon dioxide, and then decarboxylation thereof. However, these conventional methods require complicated processes using various raw materials and are not able to provide suitable particle size and morphology of the support, to the desired level.

In the meantime, Japanese laid-open patent publications Heisei03-74341, 04-368391 and 08-73388 provide synthetic methods of spherical or oval diethoxy magnesium through the reaction of magnesium metal with ethanol in the presence of iodine. However, in such methods for preparing diethoxy magnesium, a large amount of reaction heat and hydrogen are generated during the reaction which occurs very rapidly. Therefore, in said methods, it is difficult to regulate the reaction rate to the appropriate level, and the resulted product, diethoxy magnesium support disadvantageously comprises a great amount of microparticles or heterogeneous macroparticles formed of conglomerated particles.

When using a catalyst produced by using such support in olefin polymerization as it is, it causes problems such as polymers with excessively increased particle size, or destruction of particle shape owing to heat of polymerization, which causes serious troubles in process.

DISCLOSURE OF INVENTION

Technical Problem

For resolving the above-mentioned problems in prior arts, the object of the present invention is to provide a method of preparation of a support, wherein firstly, MgX(X=halogen atom) is prepared from the reaction of a reaction initiator, nitrogen halide, and magnesium metal, and then the reaction of magnesium metal and alcohol is carried out in the presence of the MgX. The method of the present invention can perform the reaction more stably as compared to the conventional methods in which an initiator is directly used, thereby reducing the amount of macroparticles of the resulted dialkoxy magnesium support, as well as providing smooth-surfaced spherical particles with a uniform size. Therefore, the present invention is to provide a method of preparation of a spherical support for olefin polymerization catalyst, being suitably used in preparation of a catalyst which can sufficiently meet the particle properties required in commercial olefin polymerization processes such as slurry polymerization, bulk polymerization and gas phase polymerization.

Technical Solution

The method of preparation of a spherical support for olefin polymerization catalyst according to the present invention provides a method in which firstly, MgX(I) (in which X=halogen atom) is prepared by reacting a reaction initiator, nitrogen halide, and magnesium metal at the same ratio in equivalent weight; and then magnesium metal and alcohol are added; and thereby the reaction of magnesium metal and alcohol is carried out in the presence of the MgX.

Magnesium metal used in the preparation method of a support according to the present invention is not strictly limited in its particle shape, however its average particle size is preferably 10300 μm in powder type, and more preferably 50200 μm in powder type. When the average particle size of magnesium metal is less than 10 μm, the average particle size of the resulting support becomes too small. In the meantime, when it is more than 300 μm, it is not desirable since the average particle size of the support becomes too big, and the support would not have a uniform spherical shape.

As for alcohol used in the preparation method of a support according to the present invention, a mixture of at least one alcohol selected from, for example, aliphatic alcohols having a general formula of ROH (wherein, R is alkyl having $C_1$-$C_6$), such as methanol, ethanol, n-propanol, isopropanol, n-butanol, isobutanol, n-pentanol, isopentanol, neo-pentanol, cyclopentanol, cyclohexanol and the like, and aromatic alcohols such as phenol is preferably used herein. More preferably, a mixture of at least one alcohol selected from methanol, ethanol, propanol and butanol, and the most preferably ethanol is used. In the mixture of two or more alcohols, the mixing ratio thereof is not specifically limited.

The ratio of magnesium metal to alcohol in the preparation method of a support according to the present invention is preferably the ratio of magnesium metal (by weight):alcohol (by volume)=1:5-1:50, and more preferably 1:7-1:20. When the ratio is less than 1:5, it is not preferred since viscosity of the slurry becomes so rapidly increased that it is difficult to achieve homogenous mixing. While, when it is more than 1:50, it causes other problems such that the bulk density of the resulting support becomes significantly decreased or the particle surface becomes coarse.

As for said nitrogen halides, i.e. a reaction initiator used in the method of preparation of a support according to the present invention, the following compounds, for example, may be used:

(1) N-halide succinimides

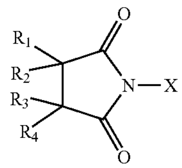

in which, X is a halogen atom; and $R_1$, $R_2$, $R_3$ and $R_4$ are independently hydrogen, or alkyl having $C_1$-$C_{12}$ or aryl having $C_6$-$C_{20}$;

(2) trihaloisocyanuric acids

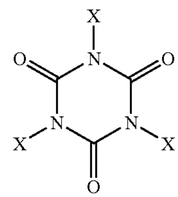

in which, X is a halogen atom;

(3) N-halophthalimides

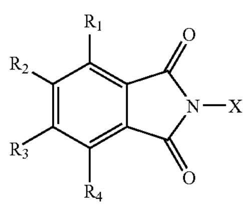

in which, X is a halogen atom; and $R_1$, $R_2$, $R_3$, and $R_4$ are independently hydrogen, or alkyl having $C_1$-$C_{12}$ or aryl having $C_6$-$C_{20}$; and (4) hydantoins

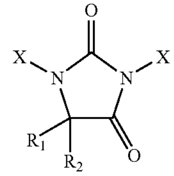

in which, X is a halogen atom; and $R_1$ and $R_2$ are independently hydrogen, or alkyl having $C_1$-$C_{12}$ or aryl having $C_6$-$C_{20}$.

Particularly, N-chlorosuccinimide, N-chlorophthalimide, N-bromosuccinimide, trichloroisocyanuric acid and 1,3-dibromo-5,5-dimethylhydantoin and the like may be used.

The nitrogen halide is used in the same equivalent weight as that of magnesium metal. When being out of said range, it is disadvantageous such that the reaction rate is too slow; the particle size of the resulted product becomes too increased; or microparticles could be produced in a great amount.

In the method of preparation of a support according to the present invention, the reaction of nitrogen halide with magnesium metal is carried out preferably in the presence of alcohol, at the temperature of 25-110?, and more preferably at 25-75° C. When the temperature is less than 25° C., the reaction becomes undesirably too slow, and when it is more than 110° C., it is not preferred since the reaction occurs so rapidly that the amount of microparticles becomes suddenly increased, particles get conglomerated, and therefore, it is not possible to obtain uniform spherical support having a desired size.

After MgX (wherein, X=halogen atom, preferably Cl, Br or I) is prepared by the reaction of magnesium metal with nitrogen halide, magnesium metal and alcohol are added, and a reaction of the magnesium metal and alcohol is carried out in the presence of the MgX wherein the MgX acts as a catalyst for the reaction of magnesium metal and alcohol. The temperature for the reaction of magnesium metal and alcohol in the presence of the MgX is preferably 75-90° C. However, it is also possible to carry out the reaction at boiling temperature of an alcohol under reflux.

Advantageous Effects

The method of preparation of a support according to the present invention remarkably reduces the amount of macroparticles, and thus makes possible for the resulted support to be applicable to commercial processes.

MODE FOR THE INVENTION

Hereinafter, the present invention is further illustrated in detail through the examples and comparative examples given below. However, the invention is by no means restricted or limited by such examples.

Examples 1

To a 5 L volume ceramic reactor equipped with a stirrer, an oil heater and a reflux condenser, sufficiently purged with nitrogen, 3.47 g (26 mmol) of N-chlorosuccinimide, 0.63 g (26 mmol) of magnesium metal (powdered product having an average particle size of 100 μm) and 130 ml of anhydrous ethanol were added. Then, the temperature of the reactor was raised to 78° C., while stirring at the speed of 240 rpm, so as to maintain reflux of ethanol. In about five minutes, after generation of MgCl(I), 30 g of magnesium metal (powder having an average particle size of 100 μm) and 200 ml of ethanol were added to the reactor, and it was allowed to react for 20 minutes. Since hydrogen is generated upon initiation of the reaction, the reactor was left open so that the generated hydrogen can be released from the reactor, and the pressure of the reactor was maintained under atmospheric pressure. Upon completion of hydrogen generation, 10 g of magnesium metal (powder having an average particle size of 100 μm) and 150 ml of ethanol were added three times more, and allowed to react for 20 minutes, respectively. Completing the addition of magnesium metal and ethanol, the reactor temperature and agitation speed in reflux conditions were maintained two hours (aging). After aging, the resulted product was washed 3 times with 1,000 ml of n-hexane for each wash, at 50° C. The washed product was dried for 24 hours under a nitrogen stream, thereby obtaining 268 g (yield: 94.9%) of a white solid powder with good flowability. From the dried product, macroparticles were removed by using a 75 μm sieve and weighed. The particle shape of the resulted product was observed with an electron microscope, and the bulk density was determined.

The results were shown in Table 1.

Example 2

The method as in Example 1 was carried out, except that as a reaction initiator, 4.72 g (26 mmol) of N-chlorophthalimide was used, thereby obtaining 265 g (yield: 93.8%) of a white solid powder with good flowability.

By using the same methods as in Example 1, the macroparticles from the resulted product were weighed; the particle shape was observed; and the bulk density was determined. The results were shown in Table 1.

Example 3

The method as in Example 1 was carried out, except that as a reaction initiator, 4.6 g (26 mmol) of N-bromosuccinimide was used, thereby obtaining 273 g (yield: 96.6%) of a white solid powder with good flowability.

By using the same methods as in Example 1, the macroparticles from the resulted product were weighed; the particle shape was observed; and the bulk density was determined. The results were shown in Table 1.

Example 4

The method as in Example 1 was carried out, except that as a reaction initiator, 6.04 g (26 mmol) of N-trihaloisocyanuric acid was used, thereby obtaining 270 g (yield: 95.6%) of a white solid powder with good fluidity.

By using the same methods as in Example 1, the macroparticles from the resulted product were weighed; the particle shape was observed; and the bulk density was determined. The results were shown in Table 1.

Example 5

The method as in Example 1 was carried out, except that as a reaction initiator, 7.4 g (26 mmol) of 1,3-dibromo-5,5-dimethylhydantoin was used, thereby obtaining 277 g (yield: 98.0%) of a white solid powder with good fluidity.

By using the same methods as in Example 1, the macroparticles from the resulted product were weighed; the particle shape was observed; and the bulk density was determined. The results were shown in Table 1.

Comparative Example 1

To a 5 L volume ceramic reactor equipped with a stirrer, an oil heater and a reflux condenser, sufficiently purged with nitrogen, 3 g of iodine, 15 g of magnesium metal (powder having an average particle size of 100 μm) and 240 ml of anhydrous ethanol were added. Then, the temperature of the reactor was raised to 78° C., while operating the stirrer at the speed of 240 rpm, so as to maintain reflux of ethanol. Then, to the reactor in which ethanol was being refluxed, 15 g of magnesium metal (powder having an average particle size of 100 μm) and 240 ml of ethanol were added in three portions at an interval of 20 minutes. After completing the addition of magnesium metal, the agitation speed was maintained constant for 2 hours, under reflux conditions of ethanol (aging). After aging, the resulted product was washed 3 times with 1,000 ml of n-hexane for each wash, at 50° C. The washed product was dried for 24 hours under a nitrogen stream, thereby obtaining 270 g (yield: 95.6%) of a white solid powder.

By using the same methods as in Example 1, the macroparticles of the resulted product were weighed; the particle shape was observed; and the bulk density was determined. The results were shown in Table 1.

TABLE 1

| | Particle shape | Bulk density (g/cc) | Amount of macroparticles (wt %) (size > 75 μm) |
|---|---|---|---|
| Example 1 | Sphere | 0.32 | 5.5 |
| Example 2 | Sphere | 0.33 | 4.8 |
| Example 3 | Sphere | 0.31 | 5.7 |
| Example 4 | Sphere | 0.30 | 5.1 |
| Example 5 | Sphere | 0.32 | 5.6 |
| Comparative Example 1 | Coarse Sphere | 0.30 | 21.4 |

As shown in Table 1, the particle shape of Examples 1-5 is a sphere, while the particle shape of Comparative Example 1 is a coarse sphere. The amount of macroparticles in Examples 1-5 is less than 6 wt %, which is significantly smaller than that of Comparative example, 21.4 wt %.

INDUSTRIAL APPLICABILITY

By the preparation method of a support according to the present invention, the amount of macroparticles of support is remarkably reduced, and a smooth-surfaced spherical support with a uniform size is provided. The support obtained by the preparation method of the present invention is suitable for a preparation of a catalyst having particle properties required in commercial olefin polymerization.

The invention claimed is:

1. A method of preparation of a spherical support for an olefin polymerization catalyst, comprising:

i) preparing MgX(I), where X is halogen atom, and (I) refers to an oxidation state number by reacting a halogenated nitrogen compound and magnesium metal at a same ratio in equivalent weight; and ii) reacting magnesium metal and alcohol in the presence of the MgX obtained from the step i), wherein the halogenated nitrogen compound is at least one selected from the group consisting of the following structures (1), (2), (3), and (4):

(1) N-halide succinimides

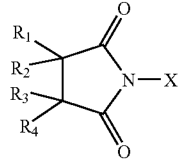

where X is a halogen atom, and $R_1$, $R_2$, $R_3$ and $R_4$ are independently hydrogen or $C_1$-$C_{12}$ alkyl or $C_6$-$C_{20}$ aryl, (2) trihaloisocyanuric acids

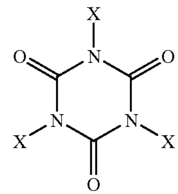

where X is a halogen atom, (3) N-halophthalimides

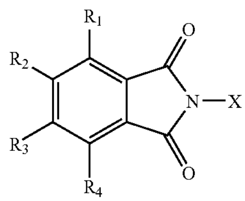

where X is a halogen atom, and $R_1$, $R_2$, $R_3$ or $R_4$ are independently hydrogen, or $C_1$-$C_{12}$ alkyl or $C_6$-$C_{20}$ aryl, and (4) hydantoins

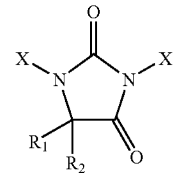

where X is a halogen atom, and $R_1$ and $R_2$ are independently hydrogen, or $C_1$-$C_{12}$ alkyl or $C_6$-$C_{20}$ aryl.

2. The method of preparation of a spherical support for an olefin polymerization catalyst according to claim 1, wherein the alcohol is at least one selected from the group consisting of aliphatic alcohols represented as a general formula of ROH where R is alkyl having $C_1$-$C_6$ and aromatic alcohols.

3. The method of preparation of a spherical support for an olefin polymerization catalyst according to claim 1, wherein, in the reaction of magnesium metal and alcohol, the magnesium metal and the alcohol are used in a ratio of magnesium metal by weight:alcohol by volume=1:5-1:50.

4. The method of preparation of a spherical support for an olefin polymerization catalyst according to claim 1, wherein the X in MgX is Cl, Br or I.

5. The method of preparation of a spherical support for an olefin polymerization catalyst according to claim 1, wherein the magnesium metal is a powder having a particle size of 10-300 μm.

6. The method of preparation of a spherical support for an olefin polymerization catalyst according to claim 1, wherein the magnesium metal is a powder having a particle size of 50-200 μm.

7. The method of preparation of a spherical support for an olefin polymerization catalyst according to claim 1, wherein the alcohol is at least one selected from the group consisting of methanol, ethanol, propanol and butanol.

8. The method of preparation of a spherical support for an olefin polymerization catalyst according to claim 1, wherein the alcohol is ethanol.

9. The method of preparation of a spherical support for an olefin polymerization catalyst according to claim 1, wherein in the reaction of magnesium metal and alcohol, the magnesium metal and the alcohol are used in a ratio of magnesium metal by weight:alcohol by volume=1:7-1:20.

10. The method of preparation of a spherical support for an olefin polymerization catalyst according to claim 1, wherein the reacting the magnesium metal and the halogenated nitrogen compound is performed at a temperature of 25-110° C.

11. The method of preparation of a spherical support for an olefin polymerization catalyst according to claim 1, wherein the reacting the magnesium metal and the halogenated nitrogen compound is performed at a temperature of 25-75° C.

12. The method of preparation of a spherical support for an olefin polymerization catalyst according to claim 1, wherein the reacting magnesium metal and alcohol in the presence of the MgX is performed at a temperature of 75-90° C.

* * * * *